W. B. WESCOTT.
LENS MOUNT.
APPLICATION FILED SEPT. 11, 1916.
1,331,174.
Patented Feb. 17, 1920.
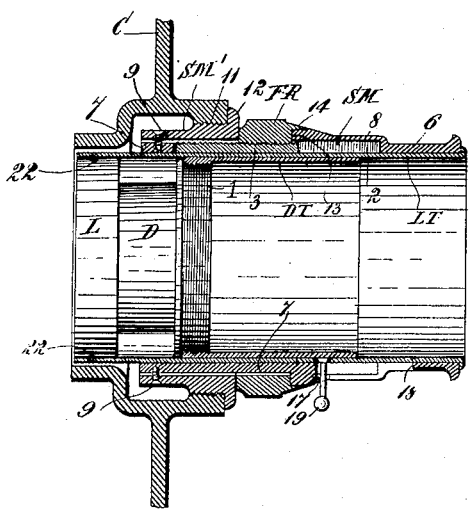
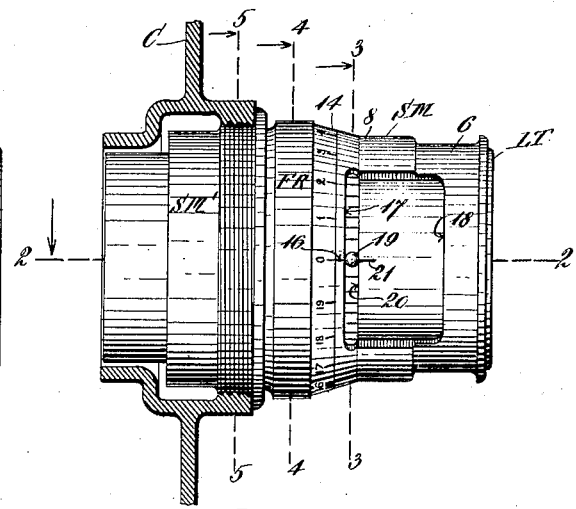
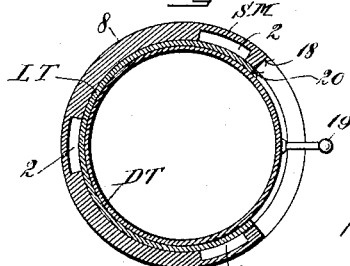
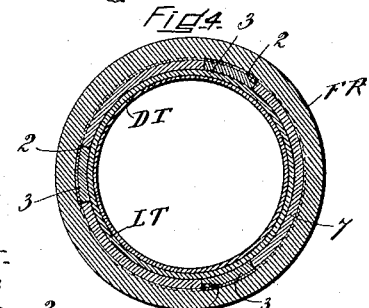
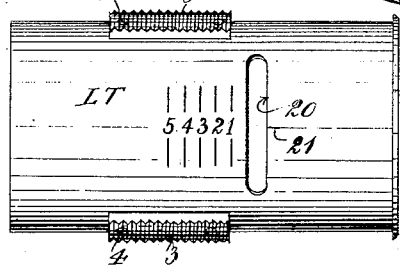
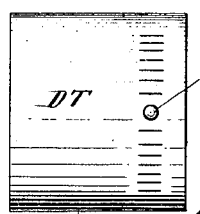
INVENTOR=
Wm B Wescott
BY Roberts Roberts Hushman
ATTORNEYS=

UNITED STATES PATENT OFFICE.

WILLIAM BURTON WESCOTT, OF WELLESLEY, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

LENS-MOUNT.

1,331,174.  Specification of Letters Patent.  Patented Feb. 17, 1920.

Application filed September 11, 1916. Serial No. 119,229.

*To all whom it may concern:*

Be it known that I, WILLIAM BURTON WESCOTT, a citizen of the United States, and resident of Wellesley, in the county of Norfolk and State of Massachusetts, have invented new and useful Improvements in Lens-Mounts, of which the following is a specification.

This invention relates to apparatus for adjustably mounting a lens whereby it may be axially reciprocated and thereby brought into proper axial position with relation to other optical apparatus.

The principal object of my invention is to provide means having an extensive bearing surface for adjustably mounting the lens, whereby the lens may be axially adjusted without rotation and without altering the direction of the axis of the lens. This I preferably accomplish by mounting the lens in a tube and providing a stationary mount for the tube having an internal bearing surface at each end for completely surrounding and engaging the lens tube and having means serving the double function of reciprocating the lens tube within the stationary mount and of preventing rotation of the lens tube with relation to the mount. Thus the lens may be reciprocated and at the same time prevented from being rotated.

A further object of my invention is to provide a stationary mount and means on the outside of the lens tube coöperating with means on the stationary mount for reciprocating the lens tube within the mount. The preferred means for this purpose comprises one or more racks secured on the outer surface of the lens tube and projecting through longitudinal slots in the stationary mount, which are somewhat longer than the racks, whereby the latter can reciprocate longitudinally in the slots, and an internally threaded ring rotatably mounted on the stationary support for engaging the racks and thereby reciprocating the lens tube. Owing to the fact that the racks and slots are comparatively narrow, the internal surface of the stationary mount can be made substantially continuous throughout its length and circumference, thereby affording an extensive bearing surface for the lens tube and in this way insuring accurate positioning of the lens carried by the tube at all positions of adjustment.

A still further object of my invention comprises means for varying the size of the aperture of the diaphragm which is preferably mounted within the lens tube in advance of the lens. Suitable means for this purpose comprises a diaphragm tube mounted concentrically within the lens tube and bearing on the inner surface of the lens tube, and means projecting outwardly through slots in the lens tube and stationary mount for rotating the diaphragm mechanism. In the preferred form of my invention the lens tube carrying the lens and the diaphragm is non-rotatable and the diaphragm adjusting means projecting outwardly through the lens tube is therefore always positioned on one side of the mount, whereby the operator can locate it with greater facility than with the former devices where the diaphragm and diaphragm controlling means are rotated together with the lens when axially adjusting the lens during the focusing process.

Other objects of the invention will be apparent from the following description and accompanying drawings, in which—

Figure 1 is a side elevation of the lens mount showing in section a portion of a camera casing to which the lens mount is attached;

Fig. 2 is a horizontal central section taken on line 2—2 of Fig. 1;

Figs. 3, 4 and 5, respectively, are transverse sections taken on lines 3—3, 4—4, and 5—5 of Fig. 1;

Fig. 6 is a side elevation of the lens tube; and

Fig. 7 is a side elevation of the diaphragm tube.

The preferred embodiment of my invention illustrated in the drawings comprises a lens tube LT mounted to reciprocate in a stationary mount comprising two tubular portions SM and SM'. In the rear end of lens tube LT is rigidly mounted the lens L and the diaphragm D. The diaphragm tube DT is mounted to bear on the inner surface of the lens tube LT and is attached to the diaphragm mechanism by means of a threaded connection 1 or other suitable means.

The stationary mount SM is of uniform internal diameter and is arranged to fit snugly over the lens tube LT. A suitable number of longitudinal slots 2 (there being three in the illustrated embodiment) are provided in the stationary mount SM to receive the racks 3 which are rigidly secured to the lens tube LT by means of screws 4. The slots are somewhat longer than the racks whereby the latter can be reciprocated within the slots. The stationary mount comprises a forward portion 6 of small external diameter and a rear portion 7 of the same external diameter. The intermediate portion 8 of the stationary mount, extending from the portion 6 to the focusing ring FR, is somewhat larger in diameter so that the slots 2 do not extend all the way through, but merely constitute recesses in, this portion to accommodate the racks. The portion 7 extends forwardly to the plane of the forward edge of the focusing ring FR and has an external diameter slightly smaller than the internal diameter of the focusing ring to provide a small amount of clearance. The portions 6, 7 and 8 of the stationary mount are preferably formed in a single integral piece but the portion SM' is made separately and is attached to the rear portion 7 by means of machine-screws 9 or other suitable means.

The member SM' has a uniform internal diameter of sufficient size to clear the racks 3. Its outer surface is provided with threads 11 and a shoulder 12 whereby it may be rigidly attached to the camera casing C or other picture apparatus, the casing in this instance comprising a forward annular flange and a rearward inturned annular flange. The shoulder 12 of the member SM' is arranged in opposition to a shoulder 13 on the portion 8 of the stationary mount SM, thereby affording a guiding channel for the focusing ring FR which is internally threaded to form a nut coöperating with the racks 3.

The outer surface of the focusing ring FR is preferably rough whereby it may readily be rotated, and the forward knife edge portion 14 is graduated in calibrations indicating the distance from the camera to the object field corresponding to the various adjustments of the lens at which the object field is properly focused on the negative. An index line coöperating with these gradations is preferably made on the exterior surface of the stationary mount SM at a suitable point, as for example, at 16. In addition to the gradations on the periphery of the focusing ring FR other gradations are preferably provided on the surface of the lens tube LT as indicated in Fig. 6. These gradations register with the rear edge 17 of the opening 18 in the stationary mount SM and constitute a rough measure of the axial position of the lens, while the gradations on the focusing ring constitute a more accurate measure of the position of the lens and are in the nature of micrometer gradations.

The diaphragm tube DT attached to the diaphragm D for rotating the latter and varying the diameter of the diaphragm aperture is preferably provided with a pin 19 projecting outwardly through a slot 20 in the lens tube LT and through the opening 18 in the stationary mount SM. The diaphragm tube may be provided with gradations calibrated in terms of effective diaphragm openings and registering with an index line 21 formed in the lens tube LT.

The most convenient manner of assembling the apparatus is as follows: The lens tube LT is inserted into the stationary mount SM from the forward end into the position shown in Figs. 1 and 2. The racks 3 are then placed in position by inserting the forward end of each within the slot 2 beneath the rear shoulder 13 of the stationary mount and securing them in position by means of the screws 4. The focusing ring FR is then threaded on the racks 3 from the rear into the position shown in Figs. 1 and 2. The portion SM' of the stationary mount is then slipped over the portion 7 forming a part of the stationary mount, into the position shown in Figs. 1 and 2, that is, until it abuts against the focusing ring FR; it is then secured in this position by means of the screws 9. The entire device may then be threaded into the casing C of the picture apparatus. The lens L may be rigidly secured to the lens tube LT by means of screws 22.

In operation, the lens is brought into the proper focusing position by rotating the focusing ring FR and thereby reciprocating the lens tube LT, the racks 3 not only coöperating with the focusing ring FR to reciprocate the lens tube, but also coöperating with the sides of the slots 2 to prevent the lens tube from rotating. The diaphragm is varied by rotating the diaphragm tube DT by means of the pin 19, the opening 18 in the stationary mount being of sufficient axial length to permit the pin to be moved in either direction to the full extent when the lens and diaphragm tube are in any adjusted position with relation to the stationary mount.

I claim:

1. A lens mount comprising a lens tube, a diaphragm mounted within the lens tube, the lens tube having a slot therein, and a pin extending outwardly through said slot into position to be engaged by the fingers to adjust the diaphragm.

2. A lens mount comprising a tubular casing, a tubular lens holder within said casing, a diaphragm within said holder, said casing and holder having superposed openings therein, and means for adjusting said diaphragm including a pin extending through said openings.

3. A lens mount comprising a tubular casing, a tubular lens holder within said casing, a diaphragm within said holder, said casing and holder having superposed openings therein, and means for adjusting said diaphragm including a pin extending through said openings, said openings being arranged to permit circumferential movement of the pin relative to one of said tubular parts and longitudinal movement relative to the other of the parts.

4. A lens mount comprising a tubular casing, a tubular lens holder within said casing, a diaphragm within said holder, said casing and holder having superposed openings therein, and means for adjusting said diaphragm including a pin extending through said openings, said openings being arranged to permit circumferential movement of the pin relative to said holder and longitudinal movement relative to said casing.

5. A lens mount comprising a tubular casing, a tubular lens holder within said casing, a diaphragm within said holder, said casing and holder having superposed openings therein, and means for adjusting said diaphragm including a pin extending through said openings, said openings being arranged to permit circumferential movement of the pin relative to one of said tubular parts and both circumferential and longitudinal movement relative to the other of the parts.

6. A lens mount comprising a tubular casing, a tubular lens holder within said casing, a diaphragm within said holder, said casing and holder having superposed openings therein, and means for adjusting said diaphragm including a pin extending through said openings, said openings being arranged to permit circumferential movement of the pin relative to said holder and both circumferential and longitudinal movement relative to said casing.

7. A lens mount comprising a lens tube, a tubular support around the lens tube having an external annular shoulder intermediate its ends and one or more longitudinal slots, racks mounted on the lens tube and arranged to project through the slots, an annular member fitting over one end of the tubular support and having a shoulder opposed to the shoulder of the tubular support, means for rigidly securing the annular member to the tubular support and an internally threaded ring mounted to rotate between the opposed shoulders for engaging the racks, whereby the lens tube may be reciprocated within the tubular support.

8. A lens mount comprising a lens tube, a tubular support around the lens tube having an external annular shoulder intermediate its ends and one or more longitudinal slots, racks mounted on the lens tube and arranged to project through the slots, an annular member fitting over one end of the tubular support and having a shoulder opposed to the shoulder of the tubular support, means for securing the annular member to the end of the tubular support and an internally threaded ring mounted to rotate between the opposed shoulders for engaging the rack, the annular member having means whereby the device may be attached to and supported by optical apparatus.

9. A lens mount comprising a lens tube, a tubular support around the lens tube, the tubular support being formed in two parts with opposing shoulders forming an annular guideway, an internally threaded ring rotatably mounted in said guideway, and one or more racks on the lens tube arranged to engage with said ring, said parts of the tubular support being provided with alined openings to receive said racks so that the racks may be moved either forwardly or rearwardly of said ring.

10. A lens mount comprising a tubular support, a lens tube reciprocatably disposed in the tubular support, a lens and a diaphragm within the lens tube, a diaphragm tube rotatably mounted within the lens tube for varying the aperture of the diaphragm, said tubular support and lens tube having superposed slots therein, and means for rotating the diaphragm tube projecting outwardly through said slots, the slot in the tubular support being sufficiently wide to permit movement of the diaphragm rotating means both angularly and axially with relation to the tubular support.

11. A lens mount comprising a tubular support, a lens tube reciprocatably disposed in the tubular support, a lens and a diaphragm within the lens tube, and means for varying the diaphragm aperture projecting outwardly through the lens tube and the tubular support, the lens tube and the tubular support having openings shaped to permit the aperture varying means to be rotated with relation to the lens tube and the tubular support and to be reciprocated with relation to the tubular support.

Signed by me at Boston, Massachusetts this 7th day of Sept., 1916.

WILLIAM BURTON WESCOTT.